Feb. 23, 1954  J. F. JORDAN  2,670,270
PRODUCTION OF PURE DIHALIDES
Filed Nov. 14, 1951
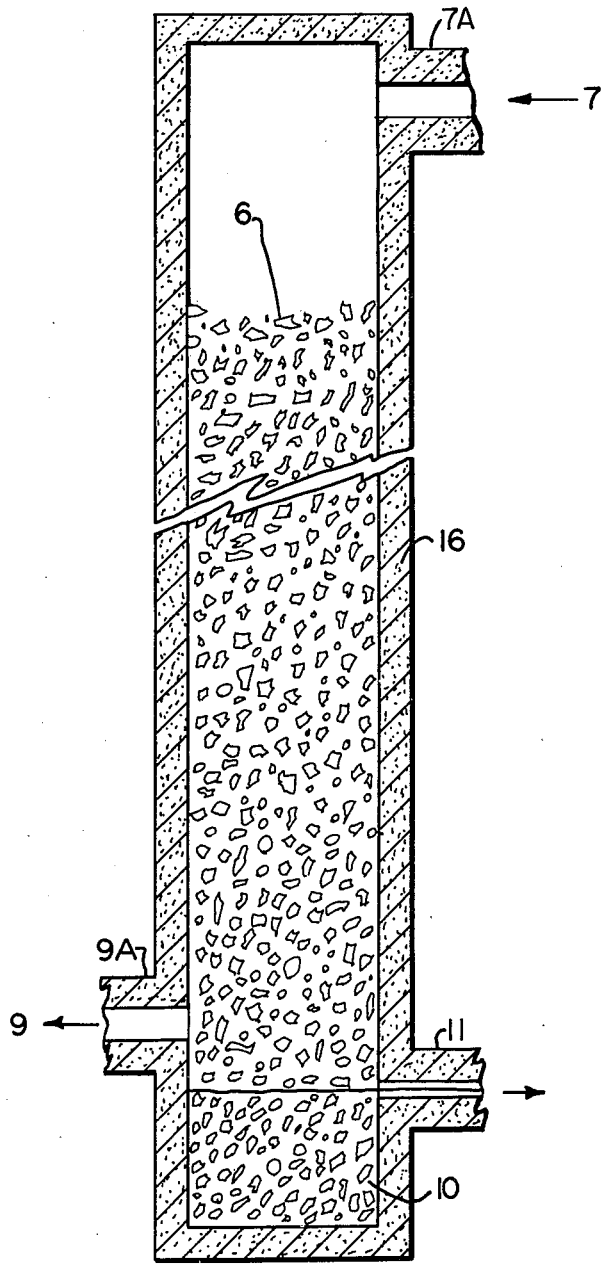
INVENTOR:-
James Fernando Jordan Patented Feb. 23, 1954

2,670,270

UNITED STATES PATENT OFFICE 2,670,270

PRODUCTION OF PURE DIHALIDES

James Fernando Jordan, Huntington Park, Calif.

Application November 14, 1951, Serial No. 256,286

2 Claims. (Cl. 23—87)

My invention relates to metallurgy wherein metal halides are employed for producing said metal.

This is a continuation-in-part of my copending application, Serial No. 165,863 of June 2, 1950, now abandoned.

The van Arkel method of refining metals involves the extraction of an impure metal with a halogen-bearing gas to form a halide gas or sublimate, followed by the thermal dissociation of said halide on an incandescent filament. The process is cyclic; that is, the thermal dissociation of the halide yields a metal deposit and a gaseous dissociation product that is recycled back into contact with the impure metal; the process being carried out within an evacuated vessel arranged so that the impure metal is kept warm while the filament is kept hot, and the circulation of the gases between said impure metal and said filament depends upon thermal convection and diffusion. The purity of the metal deposit depends upon the purity and temperature of the impure metal.

An object of my invention is an improvement in the refining characteristics of the van Arkel procedure, so that said procedure will produce a purer deposit at a faster rate, and so that said procedure may achieve these ends while refining a metal that is more impure than those which must be employed in the conventional van Arkel method.

Another object of my invention is the conversion of an impure grade of the tetrahalide of a metal into a pure dihalide of said metal, so as to improve the purity of the deposit and so as to increase the production rate by increasing the metal content of the halide being reduced. The need for pure dihalides arises not only from the above-mentioned van Arkel process, but also from certain modifications of the Kroll process for producing ductile titanium and zirconium. In addition, processes involving the disproportionation of metal halides to yield said metal have become of interest to metallurgy since the growth of a demand for the production of some of the less common metals; for example, the production of titanium by the disproportionation of titanium dichloride offers metallurgy the chance to employ van Arkel's technique without laboring under the handicap of van Arkel's costly transfer agent. Other objects will be apparent in the specification and claims.

My invention is directed towards the chlorides, iodides and bromides of titanium and zirconium; accordingly, the expression "halide" will be hereinafter taken to mean such halides.

In my process, I react the tetrahalide of the metal with an impure grade of said metal, and then I refine the resulting product by reacting it with a reactive mass consisting of an impure grade of said metal.

In the production of a pure titanium or zirconium dihalide, I react the tetrahalide of the metal with a reactant mass of an impure grade of said metal, said reactant mass being maintained at a temperature that lies above the melting point of the dihalide being produced, said reactant mass being in the form of a loosely-packed column thru which the fluid halides may be passed.

In the production of pure titanium dichloride, for example, I pass an impure grade of titanium tetrachloride thru a loosely-packed reactant column of crushed, impure titanium metal, said column being maintained at a temperature above the melting point of titanium dichloride (above 650° C.). In the production of pure titanium diiodide or titanium dibromide, I flow fluid titanium tetraiodide or titanium tetrabromide thru my reactant column at a temperature that lies above 600° C.

In the production of zirconium dichloride, I pass fluid zirconium tetrachloride thru my reactant column of crude zirconium metal at a temperature that lies above 700° C.; in the production of pure zirconium diiodide, I pass zirconium tetraiodide thru my reactant column at a temperature that lies above 400° C.; and in the production of pure zirconium dibromide, I pass fluid zirconium tetrabromide thru my reactant column at a temperature that lies above 600° C.

I have found that the tetrahalide is purified and the dihalide is produced by contacting the tetrahalide with my reactant mass at just over the melting point of the dihalide being produced, and the above reaction temperatures are estimated melting points of the dihalides involved; however, I have also observed that the conversion of the tetra to the di compounds is ordinarily not complete at said temperatures, and, accordingly, I prefer to maintain my reactant column at a temperature that lies considerably above said melting points.

In the production of titanium dichloride, for example, I prefer to maintain my reactant column at about 900° C. In a test that I ran at 900° C., employing a commercial grade of titanium tetrachloride and a reactant column consisting of the 40% grade of ferro titanium, I obtained a dichloride product that was essentially-free from tetrachloride and contained less than 0.02% iron and silicon chlorides.

In another test, I maintained the 40% grade titanium column at 800° C., and passed an impure grade of titanium tetraiodide thru the unit. The diiodide product was essentially-free from the tetraiodide and contains less than 0.02% each of iron, aluminum and silicon iodide. The operating temperature of the reactant column was, in this case, about 200° C. above the melting point of the diiodide.

In another test that I made, I maintained the

40% grade titanium column at about 800° C., and passed an impure grade of titanium tetrabromide therethru, thereby obtaining a pure titanium dibromide.

In other tests which I made, I observed that the zirconium tetrahalides acted similarly; that is, passing them thru a reactant column consisting of loosely-packed, crude zirconium metal yielded a pure grade of the dihalide of the metal being entertained.

While most of my tests involved a reactant column maintained in the range between the melting point and the boiling point of the dihalide being produced, I carried out some tests with the column above the boiling point of the dihalide being produced, the results from these tests being similar to the results from the tests wherein the column was at a temperature below the boiling point of the dihalide. The use of temperatures in excess of the boiling point of the dihalide is of interest when the product from my process is directly passed into a process wherein a high preheat is desirable; also, higher column temperatures are desirable when the crude metal contains a relatively-high percentage of oxygen and/or nitrogen, for then high operating temperatures cause the oxygen/nitrogen compounds in the metal to diffuse back into the solid metal pieces which constitute the column, thus preventing said compounds from forming a surface film on said pieces, an action that inhibits the reactivity of the column.

The tetrahalides may be introduced into the reactant column as either a liquid or a gas. I prefer to introduce the tetrahalide gas, for the preheating of the tetrahalide required to attain the gaseous state simplifies the maintenance of the temperature required in said column, and, in addition, I have observed that the process works more smoothly when the tetrahalide being introduced is in its gaseous state.

While my process is primarily concerned with the conversion of the tetrahalide into a pure dihalide, it is obvious that said tetrahalide may itself be produced within my process. Thus, iodine, chlorine or bromine may be fed into my reactant column to produce an impure grade of tetrahalide, said tetrahalide then being reduced and refined as it is passed thru my reactant column according to my process. Furthermore, a mixture of the halogen and the tetrahalide may be passed into my reactant column to produce a pure grade of the corresponding dihalide, essentially-free from said halogen and said tetrahalide. For example, I have observed that the van Arkel cracking procedure yields a mixture of iodine and titanium tetraiodide, rather than the simple iodine by-product generally accredited to the process, and such a mixture may be treated according to my process to yield a pure grade of titanium diiodide that may be cracked by a thermal process.

The crude metal of my reactant column is composed of a crude (impure) grade of the metal of the dihalide to be produced. In general, the purity of said crude metal must be such that one of two conditions be met. The crude metal must either contain the minimum percentage of those elements whose affinity for the halogen exceeds the affinity of titanium/zirconium therefor, or the impurities in said crude metal must yield low boiling point reaction products when passed thru my column, so that fractional condensation or fractional solidification procedures will permit the gaseous impurities to be separated from the non-gaseous dihalide. A pure product may also be obtained by combining both of these courses; that is, the less active impurities may be left behind in the reactant column, and the more active, low boiling point impurities may then be separated by solidifying/condensing the dihalide and allowing the gaseous halides to escape therefrom.

These several refining situations may be illustrated by the circumstances wherein the crude metal contains iron, copper, tin, etc., and the operation involves the production of titanium dichloride—here, the impurities will remain behind in the reactant column, for such impurities exhibit less affinity for chlorine than titanium exhibits. When, under the same circumstances, the crude metal also contains elements such as aluminum and/or silicon, at least a portion of the aluminum/silicon may escape from the column as the corresponding chlorides; however, the molten titanium dichloride needs merely to be collected in a pool to eliminate most of the aluminum/silicon chloride, for, at 650° C., aluminum and silicon chlorides are gases. If it is desired to lower the aluminum/silicon chloride content of the collected titanium dichloride still further, the partial pressure of the gaseous chlorides over said pool of dichloride may be lowered to achieve this result—thus, the gas phase of the reaction products may be diluted with an inert gas in order to lower said partial pressure. Nitrogen, carbon monoxide, argon, helium, hydrogen, etc. may be employed as inert gases. The refinement of the collected titanium dichloride may also be obtained by passing one of said inert gases thru the molten, collected dichloride, so as to sweep out of said dichloride other chlorides which are normally gases at the temperature of the collected dichloride.

One of the advantages of my process is that it essentially eliminates dissolved halogen from the metal halide; for example, titanium tetrachloride produced by processes involving free chlorine usually contains an appreciable percentage of dissolved chlorine, and the presence of this dissolved chlorine in the tetrachloride greatly increases the erosive action of the tetrachloride on the metal pipes, pumps, etc. that must be employed to handle the compound.

My process may be carried out in any convenient type of vessel. While my reactant column may be supported by a metal tower, I prefer to construct the tower out of a non-metallic refractory, such as carbon, silica, magnesia, etc. Fire brick may, of course, be employed. Generally, any refractory or metal that is essentially nonreactive with the halide compounds being handled will prove satisfactory. The reactant column within the tower may be maintained at temperature by either of two methods: (1) the incoming tetrahalide may be preheated sufficiently to maintain said column at temperature, or (2) said column may be heated by high frequency current arising from suitable coils wound around the tower or by resistance elements suitably situated around or within the tower.

I prefer to pass the tetrahalide down thru the reactant column, collecting the molten dihalide at the base thereof, from which base said dihalide may be arranged so that it may be continuously or periodically removed therefrom. Near said base, and above the normal level of the molten dihalide therein, I prefer to withdraw such gaseous halides as those mentioned in connection with the aluminum and silicon chlorides. This I arrange by merely penetrating the tower with an outlet for said gases near said base. If desired, the molten dihalide produced within the reactant column may be collected to form a molten pool of dihalide in a separate vessel from the one that supports my reactant column, the molten dihalide flowing to said collection vessel via a suitable pipe arrangement. If desired, the molten dihalide produced in my reactant column may be passed directly to another stage in a process designed to ultimately yield a metal; for example, said molten dihalide may be passed directly to a thermal cracking unit wherein a metal is deposited—thus, titanium dichloride may be thermally cracked to yield titanium and chlorine or said dichloride may be cracked to yield titanium and titanium tetrachloride, the chlorine/tetrachloride byproduct being passed back to my reactant column for the production of more titanium dichloride. Or, the molten dihalide of my process may be directly passed to a reaction vessel wherein said dihalide is reacted with a metallic reducing agent, such as magnesium, sodium or potassium, to yield a metal and a halide of said reducing agent. Of course, the molten dihalide from my process may be solidified to form a pure dihalide that may be employed or utilized when desired—in this connection, it should be noted that the dihalides are a fire hazard when exposed to air.

While I prefer to operate my reactant column at a temperature that lies below the boiling point of the dihalide being produced, higher temperatures may of course be employed, even desirable, especially in the case wherein diiodide is being produced. For example, in the production of titanium/zirconium diiodide, the reactant column may be maintained at, say, 2200° F.; at about 2850° F. when titanium/zirconium dichloride is being produced; and at about 2400° F. when titanium/zirconium dibromide is being produced. Condensation of these dihalide gases to form liquids may be carried out at the base of the reactant column or separate therefrom, and solidification of these dihalides may be carried out after the gaseous or liquid dihalides have left the column.

When the reactant column is being maintained at a temperature above the boiling point of the dihalide being produced, the halides flowing thru the column may be caused to flow either up and down; that is, while the presence of liquid halides in the process requires a downward flow thru the column, this restriction is not present in the absence of such liquids, and when the dihalide being produced is a gas, flow thru the column may be either up or down or the column may be caused to lie on its side, so that flow therethru is essentially horizontal.

An apparatus suitable for carrying out my process is shown in the figure. Tower 16 is shown supporting a column of loosely-packed, impure metal 6. With metal 6 preheated to the reaction temperature, incoming titanium/zirconium tetrahalide 7 is introduced via inlet 7A; flows down thru the column of metal 6, being thereby converted into the dihalide form; and, finally, collects at the base of vessel 16 to form molten pool 10. The liquid of pool 10 may be continuously or periodically withdrawn via outlet 11. Such gases as may arise during the process are withdrawn as byproduct gas 9 via outlet 9A. The process of the figure shows no method of heating metal 6, this being occasioned by the fact that, in this modification, incoming tetrahalide 7 is preheated to a high enough temperature to maintain the temperature of said metal 6. Of course the metal of column 6 may be maintained at temperature by surrounding said column with resistance or high frequency heating means (not shown).

The expression "impure grade," employed in reference to the impure titanium/zirconium that is the reducing agent of my process, may be any alloy containing 10% or more titanium/zirconium. Thus, the various grade of ferro titanium are impure grades of titanium, as are the various alloys produced by reducing a titanium-bearing ore, concentrate or compound with such reducing agents as sodium, magnesium, calcium, potassium, and the like. Similarly, the various high-silicon, zirconium alloys presently marketed as addition alloys are impure grades of zirconium, as are the various alloys produced by reducing zirconium-bearing compounds with such reducing agents as sodium, magnesium, calcium, potassium, and the like.

Having now described several forms of my process, I wish it to be understood that my invention is not to be limited to the specific form or arrangement of steps hereinbefore described, except insofar as such limitations are specified in the appended claims.

I claim as my invention:

1. The process for forming a substantially iron-free dihalide selected from the group consisting of the dichloride, dibromide and diiodide of a metal selected from the group consisting of titanium and zirconium, which comprises: heating a loosely-packed column of solid pieces of said metal containing iron to a temperature that lies above the melting point and below the boiling point of said dihalide; flowing the gaseous tetrahalide of said metal in reacting contact with said column to form the molten dihalide of said metal; and flowing said molten dihalide in reacting contact through and out of said column to form a molten dihalide that is substantially iron-free and that is substantially stable on cooling.

2. The process according to claim 1 in which said tetrahalide is formed by reacting the subject halogen with said iron-bearing metal.

JAMES FERNANDO JORDAN.

References Cited in the file of this patent

UNITED STATES PATENTS

| Number | Name | Date |
|---|---|---|
| 2,470,306 | Gross | May 17, 1949 |

OTHER REFERENCES

"Handbook of Chemistry" by N. A. Lange, 1944 ed., pp. 254–255, 264–265. Handbook Publishers, Inc., Sandusky, Ohio.

Stoddard et al.: abstract 706,498, February 21, 1950.

Stoddard et al.: abstract 653,699, May 30, 1950.

Metal Progress, February 1949, pages 193, 194. (U. S. Pat. Off. Scientific Library.)

Transactions of the Electrochemical Society, vol. 93, 1948, pages 271–285. Electrochemical Soc., Inc., 235 W. 102nd St., New York, N. Y.

Chem. Abstracts, vol. 16, 1922, pages 1051–1052.

Hackh's Chemical Dictionary, 2nd ed., 1937, page 315. P. Blakiston Co., Philadelphia, Pa.

Handbook of Chem. and Physics, 27th ed., pp. 490–491. C. D. Hodgman. Chemical Rubber Pub. Co., Cleveland, Ohio.

Mellor's "A Comprehensive Treatise on Inorganic and Theoretical Chem.," vol. 7, pp. 74, 143. Longmans, Green and Co., New York, N. Y.

"Titanium" by Jelks Barksdale, 1949 ed., pages 82–86. Ronald Press Co., New York, N. Y.